(12) United States Patent
Yang

(10) Patent No.: US 11,815,218 B2
(45) Date of Patent: Nov. 14, 2023

(54) MULTIFUNCTIONAL ROTATABLE STAND FRAME FOR TABLET ELECTRONIC DEVICE

(71) Applicant: Sampson Yang, Irvine, CA (US)

(72) Inventor: Sampson Yang, Irvine, CA (US)

(73) Assignee: The Joy Factory, inc., Irvine, CA (US)

( * ) Notice: Subject to any disclaimer, the term of this patent is extended or adjusted under 35 U.S.C. 154(b) by 0 days.

(21) Appl. No.: 17/848,414

(22) Filed: Jun. 24, 2022

(65) Prior Publication Data

US 2023/0175636 A1 Jun. 8, 2023

(30) Foreign Application Priority Data

Dec. 3, 2021 (TW) .................................. 110214484

(51) Int. Cl.
*F16M 11/12* (2006.01)
*A45F 5/10* (2006.01)
*F16M 11/10* (2006.01)

(52) U.S. Cl.
CPC ............. *F16M 11/126* (2013.01); *A45F 5/10* (2013.01); *F16M 11/105* (2013.01); *A45F 2200/0525* (2013.01)

(58) Field of Classification Search
CPC ....... F16M 11/126; F16M 11/105; A45F 5/10; A45F 2200/0525; A47G 1/1606
See application file for complete search history.

(56) References Cited

U.S. PATENT DOCUMENTS

| | | | | |
|---|---|---|---|---|
| 9,250,652 B2* | 2/2016 | London | ................ | G06F 1/1628 |
| 10,595,622 B2* | 3/2020 | Carnevali | ................ | A45F 5/10 |
| 10,905,227 B2* | 2/2021 | Carnevali | ................ | A45F 5/10 |
| 2012/0025684 A1* | 2/2012 | Trotsky | ............. | F16M 11/2028 |
| | | | | 248/688 |
| 2013/0300141 A1* | 11/2013 | Byrne | ................ | A45F 5/00 |
| | | | | 294/25 |
| 2016/0277551 A1* | 9/2016 | Williams | ............. | H04B 1/3888 |
| 2019/0141174 A1* | 5/2019 | Britt | ................ | H04B 1/3888 |
| 2021/0116066 A1* | 4/2021 | Tsui | ................ | F16M 11/38 |

* cited by examiner

Primary Examiner — Muhammad Ljaz

(57) ABSTRACT

A multifunctional rotatable stand frame for a tablet electronic device comprises a seat; a bottom of the seat serving to connect a back side of the tablet electronic device; a disk positioned above an upper side of the seat and being rotatably installed to the seat; a center of the disk having a through hole; a fixing shaft installed on the seat and penetrating through the through hole of the disk; the upper side of the seat forming with a circular wall; the fixing shaft being located at a center of the circular wall; an inner side of the circular wall forming with a plurality of trenches; a buckling ring installed at a bottom side of the disk and surrounding an outside of the through hole; the buckling ring being engaged to an inner side of the circular wall.

18 Claims, 9 Drawing Sheets

MULTIFUNCTIONAL ROTATABLE STAND FRAME FOR TABLET ELECTRONIC DEVICE

The present invention is an application of continuation in part (CTP) of U.S. patent application Ser. No. 16/658,184, filed at Oct. 21, 2019, which is invented by and assigned to the applicant of the present invention, and thus the contents of the U.S. patent application Ser. No. 16/658,184 are incorporated into the present invention as a part of the present invention.

FIELD OF INVENTION

The present invention relates to stand frames for a tablet electronic device, and in particular to a multifunctional rotatable stand frame for a tablet electronic device.

BACKGROUND OF INVENTION

The stand frame of a prior art flat form electronic device mainly contains a seat. A bottom of the seat is fixed to a back side of a flat form electronic device; a disk is positioned above the seat and is rotatably installed on the seat; a center of the disk has a through hole; a retaining shaft is on the seat and penetrates through the through hole of the disk. The disk is loosely installed to the seat by using the retaining shaft so that the disk is rotatable around the retaining shaft. An upper side of seat at a position under the disk is formed with an annular recess. The disk is buckled to the recess by using a buckle. Therefore, the disk is slidable with respect to the seat continuously and thus rotates to various positions.

The stand frame further has a frame body. One end of the frame body is pivotally connected to one side of the disk so that it is pivotally rotatable with respect to the disk. When the disk is rotated, it will drive the frame body to rotate therewith. Therefore, the rotation is continuously (not step by step).

The stand frame further comprises a hand strap is fixedly retained across two sides of the disk. When a user's hand passes through a space between an arc portion of the hand strap and the disk, the hand strap will enclose the user's hand so that the user can take the flat form electronic device.

In above mentioned prior art, the disk is buckled to the annular recess by using the buckle. Thus the disk is rotatable with respect to the seat continuously to various positions. However, this kind of operation will cause that in supporting state, the frame body is easy to loose and thus it is difficult to be fixed on a specific position. For a long time, the frame body will vibrate and thus the lifetime thereof will reduce. Furthermore, the hand strap is fixed to two ends of the disk, and thus it is unreplaceable. If it is used for a long time, the hand strap is easy to wear or be dirt; however, these are unbeneficial in usage. Therefore, all these defects in the prior art are necessary to be improved.

SUMMARY OF THE INVENTION

To improve above defects in the prior art, the present invention provides a multifunctional rotatable stand frame for a tablet electronic device, wherein the disk is retained by the buckling ring and circular wall. When using, the disk is retained at specific location so as not to be loose. Therefore, the stand frame of the present invention can support the tablet computer stably. The user can also hang the stand frame of the present invention on a specific location. For a long time, the lifetime of the stand frame of the present invention is prolonged. The buckle ring and ring wall form a simple structure so that the overall cost can be reduced. The stand frame of the present invention is capable of being screwed to another device, such as an external supporting object for supporting the stand frame of the present invention. All above mentioned advantages of the present invention cannot be achieved by any prior art.

To achieve above object, the present invention provides a multifunctional rotatable stand frame for a tablet electronic device comprising a seat; a bottom of the seat serving to connect a back side of the tablet electronic device; the seat having a plurality of retaining holes; in installing, the seat being connected to the tablet electronic device by using a connecting unit to pass through the retaining hole of the seat and a locking hole of the tablet electronic device; so that the seat is installed to the tablet electronic device; a disk positioned above an upper side of the seat and rotatably installed to the seat; a center of the disk having a through hole; a fixing shaft installed on the seat and penetrating through the through hole of the disk; the disk being loosely arranged to the seat through the fixing shaft and being rotatable with respect to the fixing shaft; wherein the upper side of the seat is formed with a circular wall; the fixing shaft is located at a center of the circular wall; an inner side of the circular wall is formed with a plurality of trenches; a buckling ring installed at a bottom side of the disk and surrounding an outside of the through hole; the buckling ring being engaged to an inner side of the circular wall; the buckling ring having a circular structure; an outer side of the buckling ring forming a plurality of buckles; each of the buckles being engaged to a respective one trench; and wherein when the disk rotates, the buckling ring rotates therewith, and the buckle leaves from the trench and moves along the inner side of the buckling ring so as to be engaged into another trench; and by moving the buckle to various trenches, the disk is fixed on various angles.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

In the present invention, a tablet computer 1 is used for description of the present invention, however the present invention is suitable for various kinds of tablet (or flat form) electronic devices, such as tablet computers, mobile phones, PDA (personal digital assistant), notebook computers, etc. Preferably, these tablet electronic device has a flat back side.

With reference to FIGS. 1 to 15, the structure of the present invention is illustrated. The present invention contains the following elements.

Figure 7:
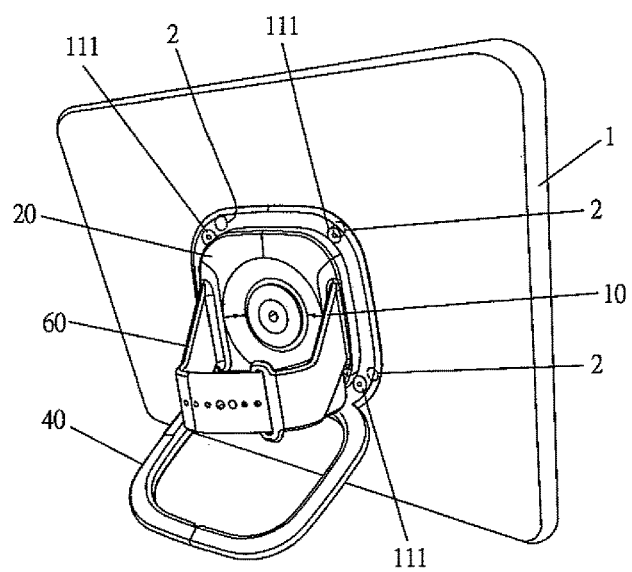
FIG. 7 is a schematic view showing that the present invention is used to support a tablet computer.

A seat 10 is included. The bottom of the seat 10 serves to connect a back side of the tablet computer 1. The seat 10 has a plurality of retaining holes 11. In installing, the seat 10 is connected to the tablet computer 1 by using a connecting unit 111 to pass through the retaining hole 11 of the seat 10 and a locking hole 2 of the tablet computer 1. Therefore, the seat 10 is installed to the tablet computer 1 (as shown in FIG. 7). Preferably, the seat 10 is a rectangular flat plate 13 and the plurality of retaining holes 11 are at four corners of the flat plate 13.

Figure 1:
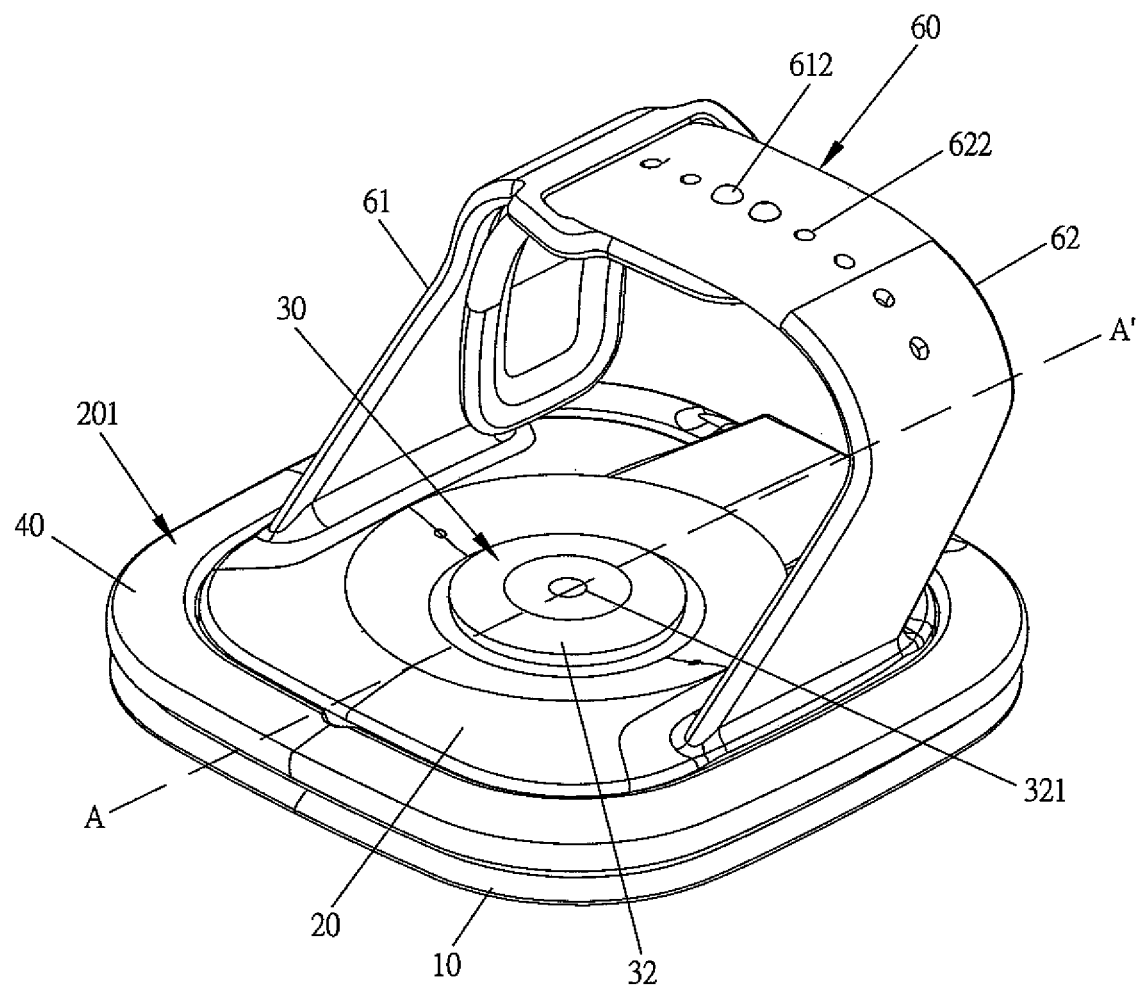
FIG. 1 is an assembly schematic view of the present invention.

A disk 20 is located above an upper side of the seat 10 and is rotatably installed to the seat 10 (as shown in FIG. 1). A center of the disk 20 has a through hole 21.

A fixing shaft 30 is installed on the seat 10 and penetrates through the through hole 21 of the disk 20. The disk 20 is loosely arranged to the seat 10 through the fixing shaft 30 and is rotatable with respect to the fixing shaft 30.

Figure 3:
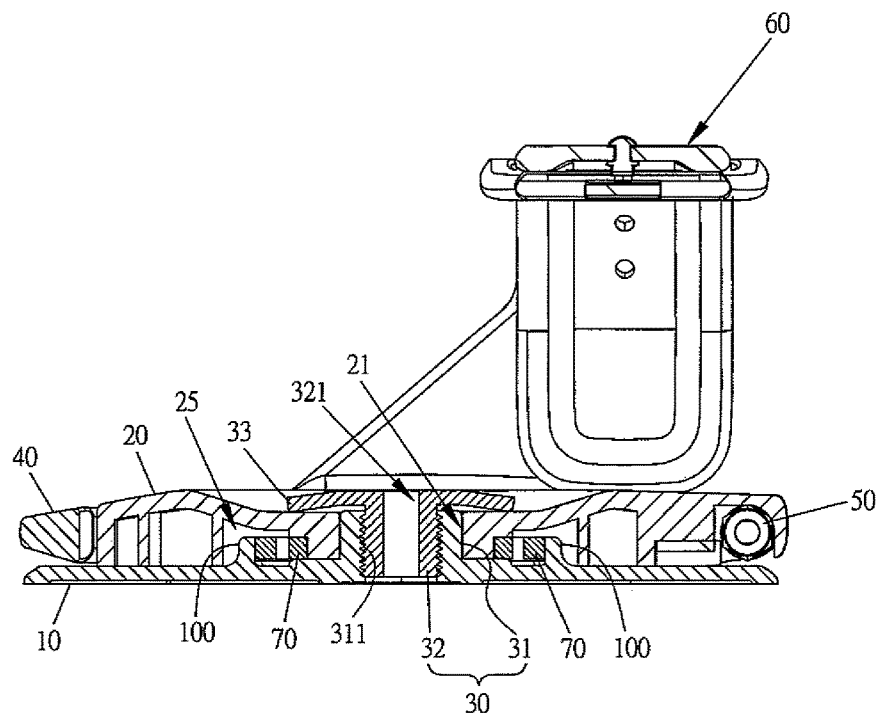
FIG. 3 is a schematic cross view along line A-A' of FIG. 1.

As shown in FIG. 3, the fixing shaft 30 contains a rotatable shaft 31 at a center portion of the seat 10 and a fixing unit 32 connected to an upper side of the rotatable shaft 31. A center of the rotatable shaft 31 is formed with a locking hole 311. An upper side of the fixing unit 32 is formed with an expansion portion 33 so that the disk 20 is clamped between the expansion portion 33 and the seat 10. A lower side of the fixing unit 32 is locked to the locking hole 311 of the rotatable shaft 31. Preferably, the rotatable shaft 31 and the seat 10 are integrally formed. The locking hole 311 of the rotatable shaft 31 penetrates through the seat 10.

The disk 20 is rotatable with respect to the seat 10 by using at least one ball 70.

The upper side of the seat 10 is formed with a circular wall 100. The fixing shaft 30 is located at a center of the circular wall 100. An inner side of the circular wall 100 is formed with a plurality of trenches 12. Preferably, the plurality of trenches 12 are 16 trenches 12 which are arranged around a round and are spaced with an equal distance. Two adjacent trenches 12 have an angle deviation of 22.5 degrees.

Figure 6A:
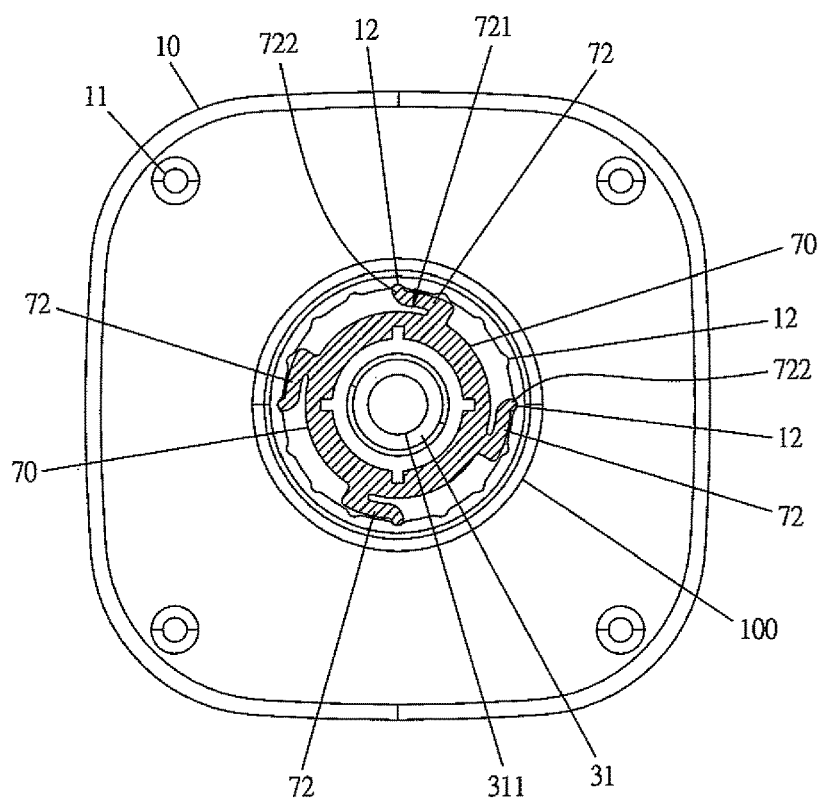
FIG. 6A is an assembly schematic view of the buckling ring and the seat of the present invention.

A buckling ring 70 is installed at a bottom side of the disk 20 and surrounds an outside of the through hole 21. The buckling ring 70 is engaged to an inner side of the circular wall 100. The buckling ring 70 has a circular structure. An outer side of the buckling ring 70 is formed with a plurality of buckles 72. Each of the buckles 72 is engaged to a respective one trench 12. As shown in FIG. 6A, the buckle 72 is formed as an L shape. An end of the buckle 72 connects to the outer side of the buckling ring 70. A recess 721 is formed between the buckle 72 and the outer side of the circular wall 100. An end of the buckle 72 is formed with a flange 722. The flange 722 is located at an outer side of the recess 721. The flange 722 is engaged to a respective one trench 12 of the circular wall 100. Preferably, the plurality of buckles 72 are four buckles 72.

Figure 6B:
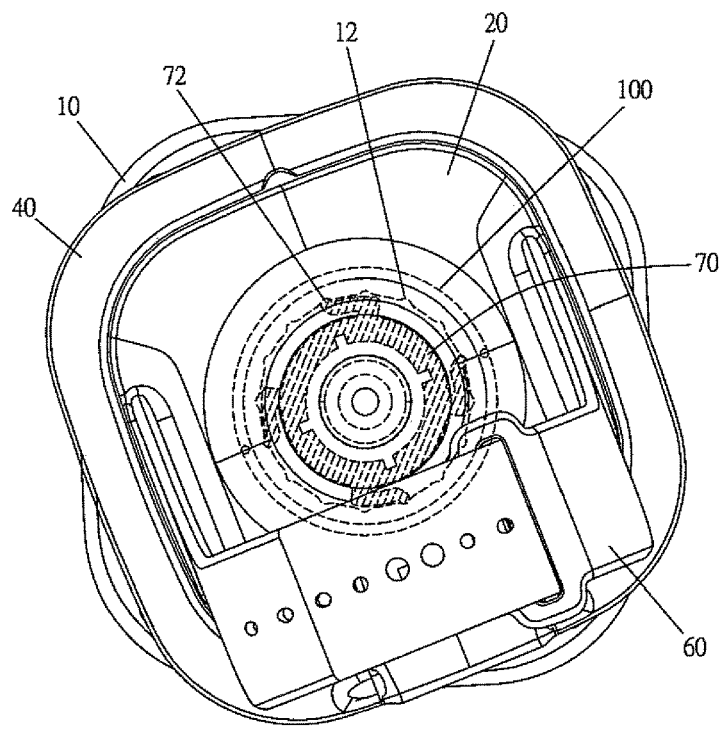
FIG. 6B is a schematic view showing the rotation of the disk.

When the disk 20 rotates, the buckling ring 70 rotates with the disk 20, and the buckle 72 leaves from the trench 12 and moves along the inner side of the buckling ring 70 so as to be engaged into another trench 12 (as shown in FIG. 6B). By moving the buckle 72 to various trenches 12, the disk 20 is fixed on various angles by a step by step way.

Figure 14:
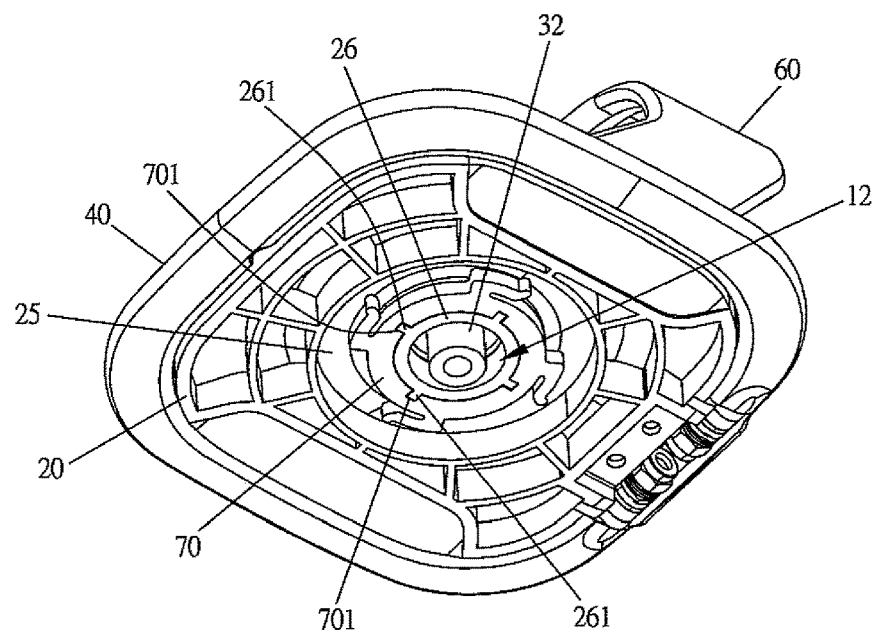
FIG. 14 is a schematic view showing a bottom side of the disk.
Figure 15:
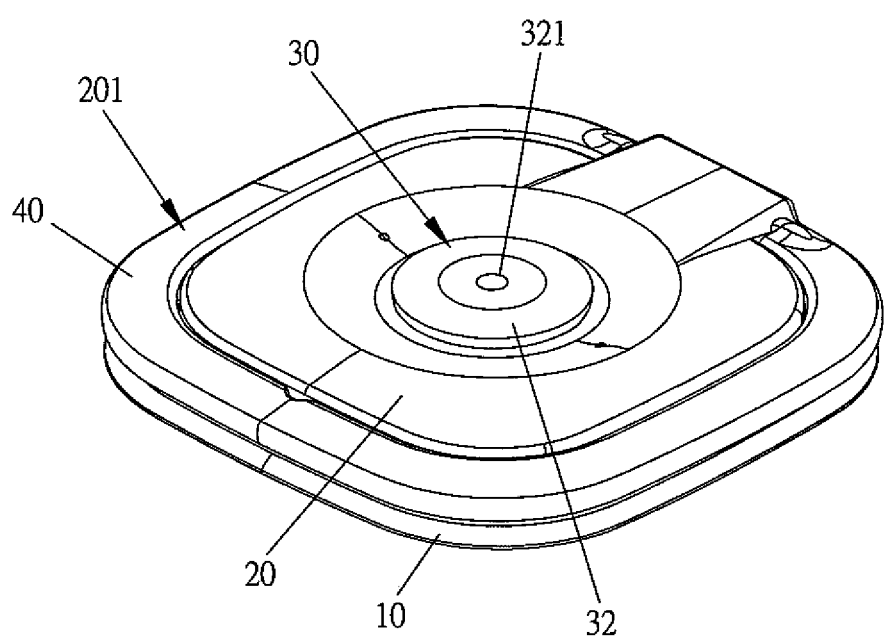
FIG. 15 is another assembly schematic view without the hand strap of the present invention.

As shown in FIG. 14, a bottom side of the disk 20 is formed with an recessing portion 25. The buckling ring 70 and a lower end of the through hole 21 are located at the recessing portion 25. A installing ring 26 surrounds the lower end of the through hole 21. An outer side of the installing ring 26 is formed with a plurality of protruded portions 261. An inner side of the buckling ring 70 is formed with a plurality of connecting slots 701. Each of the protruded portions 261 is buckled to a respective one connecting slots 701.

The disk 20 is formed with an application unit 201. By the application unit 201, the present invention may be provided with many applications.

In the present invention, the application unit 201 is a frame 40. One end of the frame 40 is pivotally installed at a side of the disk 20. By rotating the frame 40, the frame 40 can support the back side of the tablet computer 1 so as to cause the tablet computer 1 to stand. As shown in FIG. 7, an angle is formed between the frame 40 and the tablet computer 1.

Figure 9:
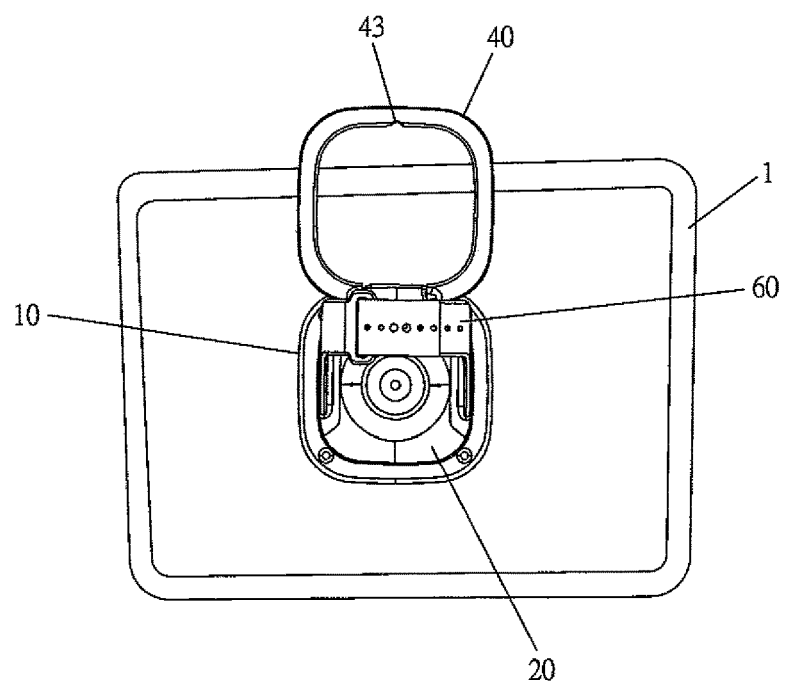
FIG. 9 is a schematic view showing an application which shows that the present invention is used as a hander.
Figure 10:
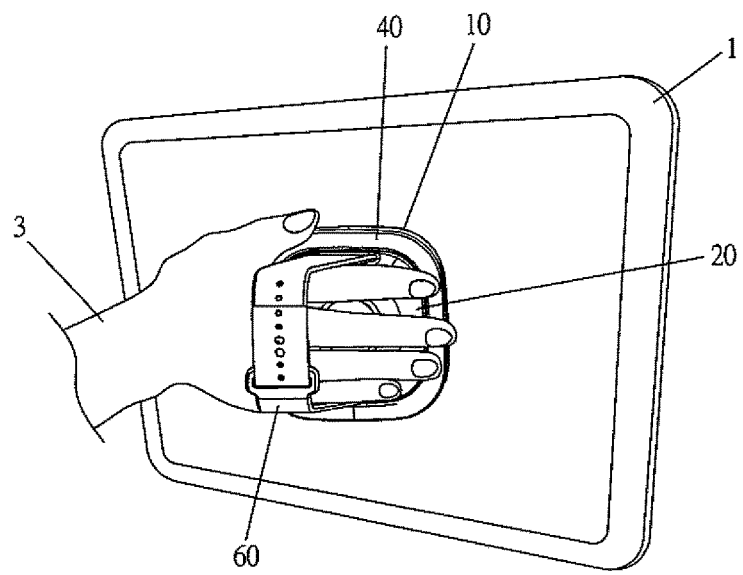
FIG. 10 is a schematic view showing the application of the hand strap.

By rotating the frame 40, the frame 40 is also used as a hander. As shown in FIG. 9, when the frame 40 is parallel to the tablet computer 1, a side of the frame 40 far away from the disk 20 serves to hang the tablet computer 1 on a specific location. Preferably, the side of the frame 40 far away from the disk 20 is formed with a groove 43 for receiving in a fixed end of an object (not shown).

The frame 40 has an approximate circular structure and is fitting to outlines of the disk 20. In a storing state, the frame 40 is annularly arranged an outer periphery of the disk 20.

Figure 5:
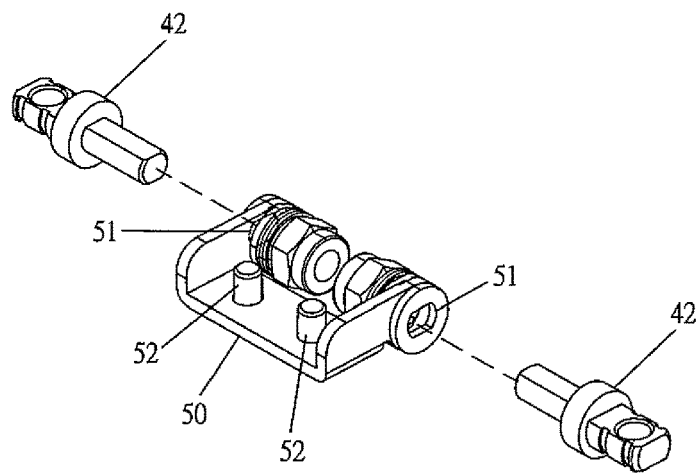
FIG. 5 is an exploded schematic view showing the pivotal unit and insertion unit of the present invention.

The disk 20 is pivotally installed to the frame 40 by using a pivotal unit 50. The pivotal unit 50 is located at the side of the disk 20. Two ends of the pivotal unit 50 are formed with two respective pivotal holes 51. Two ends of the frame 40 are connected to the pivotal unit 50 by two respective inserting units 42. One end of the inserting unit 42 is installed on a respective connecting hole 41 at one of the two ends of the frame 40. Another end of the inserting unit 42 is inserted into the respective pivotal hole 51 at one of the two ends of the pivotal unit 50 (as shown in FIG. 5) so that the frame 40 is rotatable around a center of the inserting unit 42. Preferably, the pivotal unit 50 is locked on the disk 20 by using a screw 52. The two ends of the inserting unit 42 have a cylindrical structure and a middle part of the inserting unit 42 has a larger cross section than those of the two ends of the inserting unit 42.

A hand strap 60 is arranged across two sides of the disk 20. The two sides of the disk 20 are formed with two via holes 22, respectively. Two ends of the hand strap 60 are inserted into the two via holes 22, respectively. Therefore, the hand strap 60 is fixed to the disk 20. The hand strap 60 serves to be held on a user's hand. A space between the hand strap 60 and the disk 20 serves to receive a user's hand 3 so that the hand strap 60 winds around the user's hand 3. Therefore, the user can take the tablet computer 1. In the embodiment shown in FIG. 15, the disk 20 is not installed with the hand strap 60.

Figure 4:
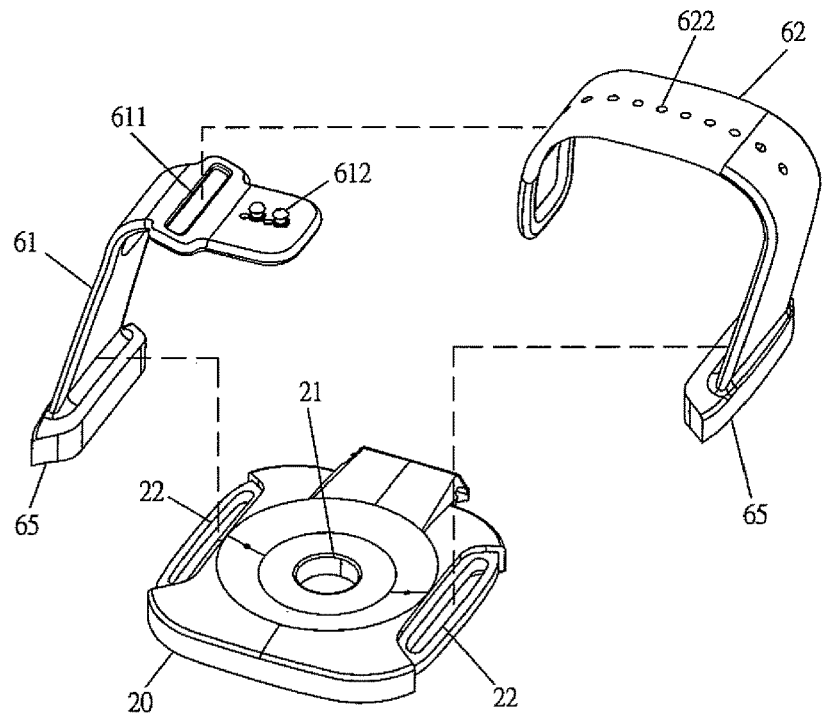
FIG. 4 is an exploded schematic view of the left strap, the right strap and the disk of the present invention.

As shown in FIG. 4, the hand strap 60 includes a left strap 61 and a right strap 62. Two fixing portion 65 are expanded from bottoms of the left strap 61 and the right strap 62, respectively. The fixing portion 65 is fixed at a lower side of a respective one via holes 22. The left strap 61 has a left hole 611 and at least one buckle 612. The right strap 62 has a plurality of buckling holes 622. Each buckle 612 of the at least one buckle 612 of the left strap 61 is buckled in one of the buckling holes 622 of the right strap 62. An end of the right strap 62 inserts into the left hole 611 of the left strap 61. By buckling the buckle 612 into various buckling holes 622, a length of the hand strap 60 is changed and a size of a space between the hand strap 60 and the disk 20 is adjustable to suit the user's hand 3.

Figure 8:
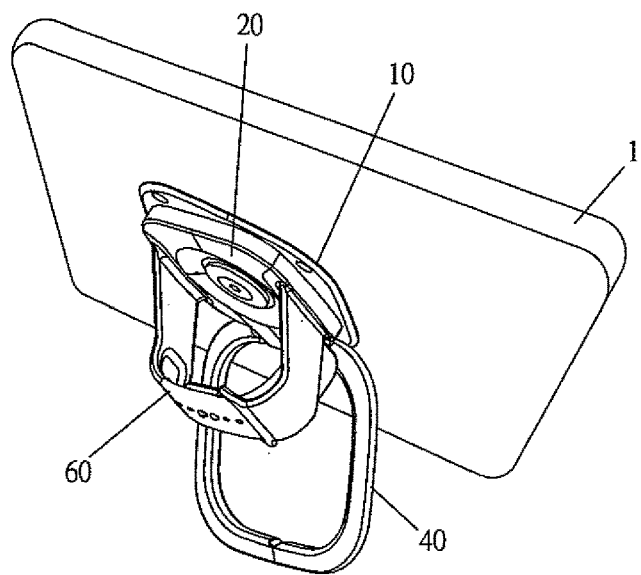
FIG. 8 is a schematic view showing the application of rotation of the disk and the turning of the frame.

When using, the seat 10 is installed to the tablet computer 1. For causing the tablet computer 1 to stand, the user can rotate the disk 20 to a specific direction to adjust the direction of the frame 40. Then the frame 40 is rotated to cause that the frame 40 can support the tablet computer 1, and therefore, the tablet computer 1 can stand. As shown in FIG. 8, a standing direction and a standing angle of the tablet computer 1 is changeable by adjusting the angle of the disk 20 and the angle between the frame 40 and the tablet computer 1.

For hanging the tablet computer 1, the user can rotate the disk 20 to a specific location to change the direction of the frame 40. Then, rotating the frame 40 causes the frame 40 to be hung from a specific location, such as a wall. A hanging angle of the tablet computer 1 is changeable by adjusting the angle of the disk 20.

If the user desires to take the tablet computer 1, the user can make his or her hand 3 pass through the space between the hand strap 60 and the disk 20 so that the hand strap 60 winds around the user's hand 3. To take the tablet computer 1, the user can also directly hold the hand strap 60.

Figure 2:
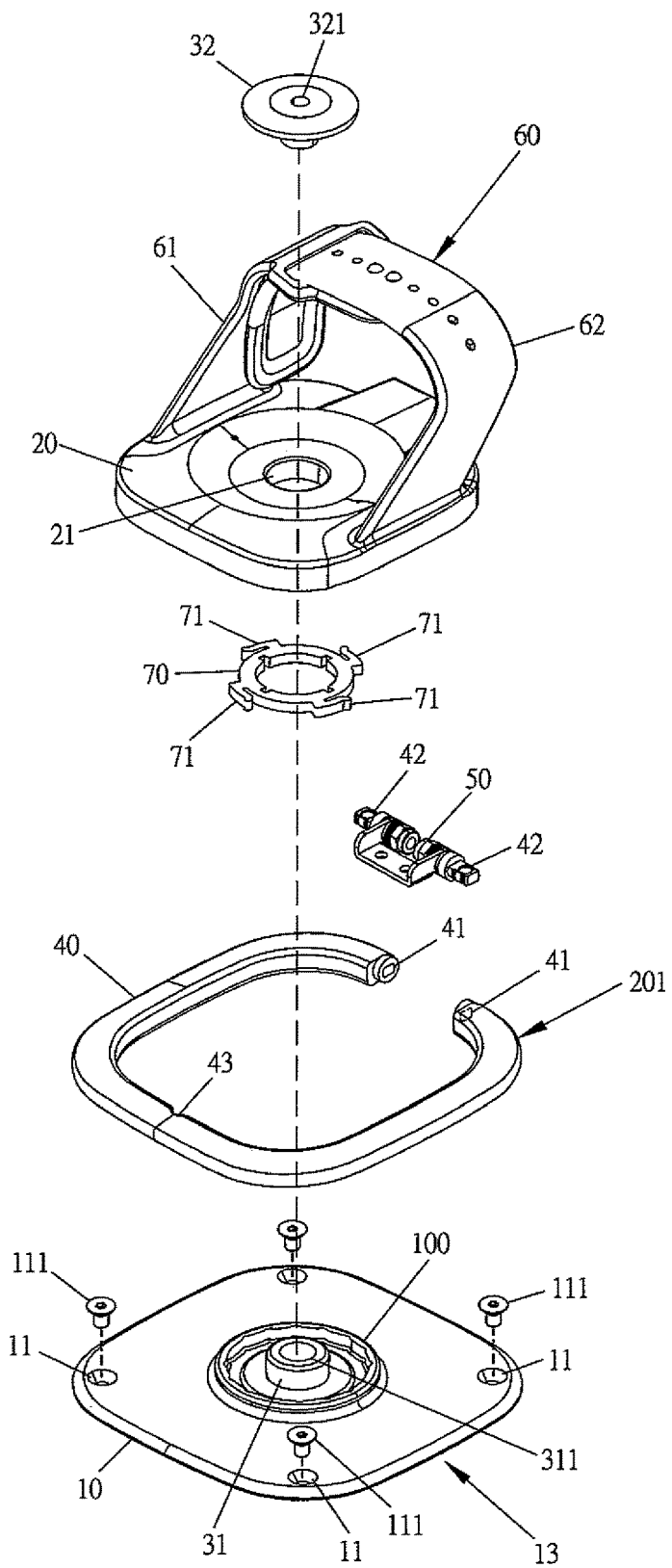
FIG. 2 is an exploded schematic view of the present invention.
Figure 11:
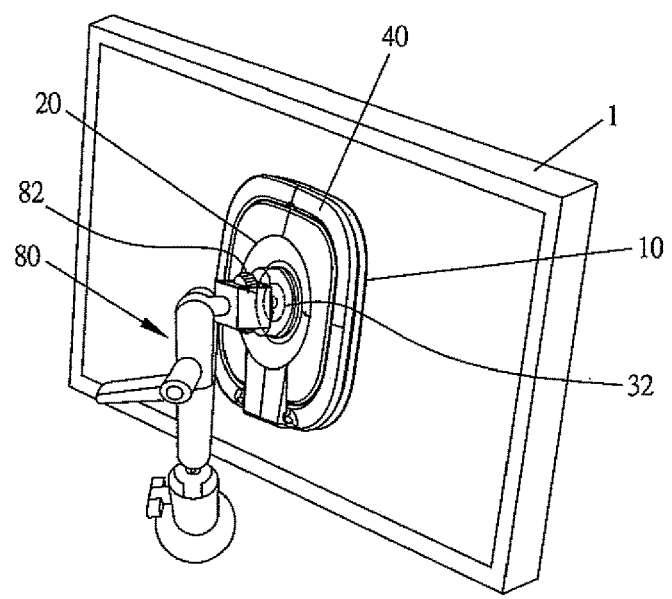
FIG. 11 is a schematic view showing that the present invention is used to connect the supporting object.
Figure 12:
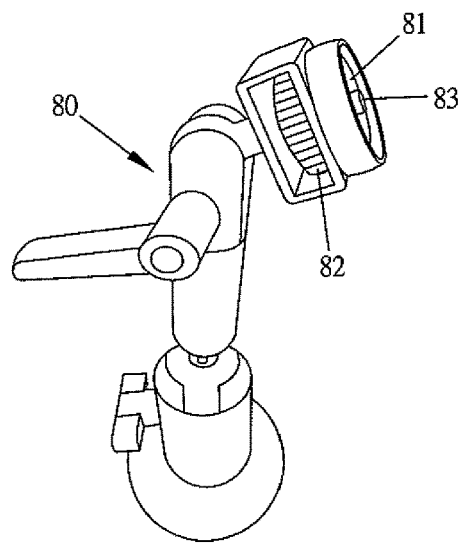
FIG. 12 is a schematic view showing the supporting object of FIG. 11.
Figure 13:
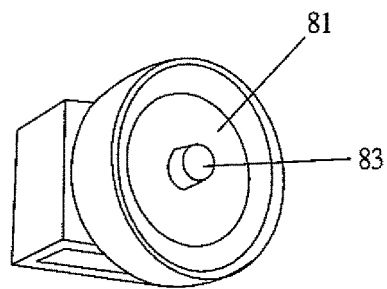
FIG. 13 is a partial schematic view showing that the supporting object of FIG. 12 is viewed from another viewing angle.

As shown in FIG. 2, a center of the fixing unit 32 has a screw hole 321 for screwing an object. An application example is shown in FIG. 11. The tablet computer 1 is retained on a supporting object 80. The disk 20 is not installed with the hand strap 60. The supporting object 80 is screwed to the screw hole 321 at the center of the fixing unit 32. The supporting object 80 contains a connecting magnetic surface 81 (as shown in FIGS. 12 and 13). A center of the connecting magnetic surface 81 has a screw rob 83 which is movable by using a screw ring 82. By connecting the connecting magnetic surface 81 and the outer surface of the fixing unit 32, and rotating the screw ring 82 to cause the screw rob 83 to screw into the screw hole 321 of the fixing unit 32, so that the supporting object 80 can be installed on the tablet computer 1 stably.

Advantages of the present invention are that the disk is retained by the buckling ring and circular wall. When using, the disk is retained at specific location so as not to be loose. Therefore, the stand frame of the present invention can support the tablet computer stably. The user can also hang the stand frame of the present invention on a specific location. For a long time, the lifetime of the stand frame of the present invention is prolonged. The buckle ring and ring wall form a simple structure so that the overall cost can be reduced. The stand frame of the present invention is capable of being screwed to another device, such as an external supporting object for supporting the stand frame of the present invention. All above mentioned advantages of the present invention cannot be achieved by any prior art.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A multifunctional rotatable stand frame for a tablet electronic device comprising:

a seat; a bottom of the seat serving to connect a back side of the tablet electronic device; the seat having a plurality of retaining holes; in installing, the seat being connected to the tablet electronic device by using a connecting unit to pass through one of the plurality of retaining holes of the seat and a locking hole of the tablet electronic device; so that the seat is installed to the tablet electronic device;

a disk positioned above an upper side of the seat and rotatably installed to the seat; a center of the disk having a through hole;

a fixing shaft installed on the seat and penetrating through the through hole of the disk; the disk being loosely arranged to the seat through the fixing shaft and being rotatable with respect to the fixing shaft;

wherein the upper side of the seat is formed with a circular wall; the fixing shaft is located at a center of the circular wall; an inner side of the circular wall is formed with a plurality of trenches;

a buckling ring installed at a bottom side of the disk and surrounding an outside of the through hole; the buckling ring being engaged to the inner side of the circular wall; the buckling ring having a circular structure; an outer side of the buckling ring forming a plurality of buckles; each of the buckles being engaged to a respective one trench; and wherein when the disk rotates, the buckling ring rotates therewith, and the buckle leaves from the trench and moves along the inner side of the buckling ring so as to be engaged into another trench; and by moving the buckle to various trenches, the disk is fixed on various angles.

2. The multifunctional rotatable stand frame for a tablet electronic device as claimed in claim 1, wherein the plurality of trenches are 16 trenches which are arranged as a round and are spaced with an equal distance; and two adjacent trenches have an angle deviation of 22.5 degrees.

3. The multifunctional rotatable stand frame for a tablet electronic device as claimed in claim 1, wherein the buckle is formed as an L shape; an end of the buckle connects to the outer side of the buckling ring; a recess is formed between the buckle and the outer side of the circular wall; an end of the buckle is formed with a flange; the flange is located at an outer side of the recess; and the flange is engaged to a respective one trench of the circular wall.

4. The multifunctional rotatable stand frame for a tablet electronic device as claimed in claim 1, wherein the plurality of buckles are four buckles.

5. The multifunctional rotatable stand frame for a tablet electronic device as claimed in claim 1, further comprising:

a hand strap arranged across two sides of the disk; the two sides of the disk being formed with two via holes, respectively; two ends of the hand strap being inserted into the two via holes, respectively; and the hand strap being fixed to the disk; and wherein to take the tablet electronic device, a user can directly hold the hand strap, or make his or her hand pass through a space between the hand strap and the disk so that the hand strap winds around the user's hand.

6. The multifunctional rotatable stand frame for a tablet electronic device as claimed in claim 5, wherein the hand strap includes a left strap and a right strap; two fixing portion are expanded from bottoms of the left strap and the right strap, respectively; each of the fixing portions is fixed at a lower side of a respective one via holes; the left strap has a left hole and at least one buckle; the right strap has a plurality of buckling holes; each buckle of the at least one buckle of the left strap is buckled into a respective one of the buckling holes of the right strap; an end of the right strap inserts into the left hole of the left strap; by buckling the buckle into various buckling holes, a length of the hand strap is changeable and a size of a space between the hand strap and the disk is adjustable to suit the user's hand.

7. The multifunctional rotatable stand frame for a tablet electronic device as claimed in claim 6, wherein a bottom side of the disk is formed with an recessing portion; the buckling ring and a lower end of the through hole are located at the recessing portion; an installing ring surrounds the lower end of the through hole; an outer side of the installing ring is formed with a plurality of protruded portions; an inner side of the buckling ring is formed with a plurality of connecting slots; and each of the protruded portions is buckled to a respective one connecting slots.

8. The multifunctional rotatable stand frame for a tablet electronic device as claimed in claim 1, wherein the disk is formed with frame; and one end of the frame is pivotally installed at a side of the disk;

wherein by rotating the frame, the frame can support the back side of the tablet electronic device so as to cause the tablet electronic device to stand; and wherein by rotating the frame, the frame is used as a hander; a side of the frame far away from the disk serves to hang the tablet electronic device on a specific location.

9. The multifunctional rotatable stand frame for a tablet electronic device as claimed in claim 8, wherein the side of the frame far away from the disk is formed with a groove for receiving in a fixed end of an object.

10. The multifunctional rotatable stand frame for a tablet electronic device as claimed in claim 8, wherein the frame has an approximate circular structure and is fitting to outlines of the disk; in a storing state, the frame is annularly arranged an outer periphery of the disk.

11. The multifunctional rotatable stand frame for a tablet electronic device as claimed in claim 8, wherein the disk is pivotally installed to the frame by using a pivotal unit; the pivotal unit is located at the side of the disk; two ends of the pivotal unit are formed with two respective pivotal holes; two ends of the frame are connected to the pivotal unit by two respective inserting units; one end of the inserting unit is installed on a respective connecting hole at one of the two ends of the frame; and another end of the inserting unit is inserted into the respective pivotal hole at one of the two ends of the pivotal unit so that the frame is rotatable around a center of the inserting unit, and the pivotal unit is locked on the disk.

12. The multifunctional rotatable stand frame for a tablet electronic device as claimed in claim 11, wherein the two ends of the inserting unit have a cylindrical structure and a middle part of the inserting unit has a larger cross section than those of the two ends of the inserting unit.

13. The multifunctional rotatable stand frame for a tablet electronic device as claimed in claim 1, wherein the seat is a rectangular flat plate and the plurality of retaining holes are at four corners of the flat plate.

14. The multifunctional rotatable stand frame for a tablet electronic device as claimed in claim 1, wherein the fixing shaft contains a rotatable shaft at a center portion of the seat and a fixing unit connected to an upper side of the rotatable shaft; a center of the rotatable shaft is formed with a locking hole; an upper side of the fixing unit is formed with an expansion portion so that the disk is clamped between the expansion portion and the seat; a lower side of the fixing unit is locked to the locking hole of the rotatable shaft.

15. The multifunctional rotatable stand frame for a tablet electronic device as claimed in claim 14, wherein the locking hole of the rotatable shaft penetrates through the seat.

16. The multifunctional rotatable stand frame for a tablet electronic device as claimed in claim 14, wherein a center of the fixing unit has a screw hole for screwing an object.

17. The multifunctional rotatable stand frame for a tablet electronic device as claimed in claim 16, wherein the tablet electronic device is retained on a supporting object; the supporting object is screwed to the screw hole at the center of the fixing unit; the supporting object contains a connecting magnetic surface; a center of the connecting magnetic surface has a screw rob which is movable by using a screw ring; by connecting the connecting magnetic surface and the outer surface of the fixing unit, and rotating the screw ring to cause the screw rob to screw into the screw hole of the fixing unit, so that the supporting object is installed on the tablet electronic device stably.

18. The multifunctional rotatable stand frame for a tablet electronic device as claimed in claim 1, wherein the tablet electronic device is selected from tablet computers, mobile phones, PDA (personal digital assistant), and notebook computers.

* * * * *